United States Patent [19]

Lutz et al.

[11] Patent Number: 5,690,225
[45] Date of Patent: Nov. 25, 1997

[54] SUPPORT FOR ANNULAR BODIES AND SUPPORT WITH STACKED ANNULAR BODIES

[75] Inventors: Gottfried Lutz, Seefeld; August Liepold, München; Regina Fischer, München; Hartmut Thiele, München; Ludwig Zeroni, Ottobrunn; Dietmar Hübner, Oberkirch, all of Germany

[73] Assignee: BASF Magnetics GmbH, Ludwigshafen, Germany

[21] Appl. No.: 567,055

[22] Filed: Dec. 4, 1995

[30] Foreign Application Priority Data

Dec. 7, 1994 [DE] Germany .................... 94 19 393 U

[51] Int. Cl.⁶ ............................................. B65D 85/67
[52] U.S. Cl. ........................... 206/416; 206/397; 206/413
[58] Field of Search ............................ 206/54, 397, 405, 206/406, 407, 413, 414, 415, 416, 805

[56] References Cited

U.S. PATENT DOCUMENTS

| 894,906 | 8/1908 | Rothermel | 206/416 |
|---|---|---|---|
| 1,517,940 | 12/1924 | Bellairs | 206/416 |
| 2,059,267 | 11/1936 | Nichols | 206/416 |
| 2,625,317 | 1/1953 | MacChesney | 206/416 |
| 3,125,216 | 3/1964 | Kulka | 206/407 |
| 4,034,926 | 7/1977 | Wegner | 206/805 |
| 5,105,943 | 4/1992 | Lesko et al. | 206/397 |
| 5,205,412 | 4/1993 | Krieg . | |
| 5,462,164 | 10/1995 | Cornelissen et al. | 206/414 |

*Primary Examiner*—David T. Fidei
*Attorney, Agent, or Firm*—Keil & Weinkauf

[57] ABSTRACT

A support for at least a single annular body or a plurality of stacked annular bodies, comprising a hollow cylinder and retaining bodies with flanges and annular attachments and also provided with hook devices for at least one tensioning element, whereby the parts of the support itself and the annular body or the annular bodies are held together or stored. The support can be used for any type of rings, annular plates etc. and also of wound-up bodies in band form.

17 Claims, 2 Drawing Sheets

SUPPORT FOR ANNULAR BODIES AND SUPPORT WITH STACKED ANNULAR BODIES

The invention relates to a support for at least one annular body, in particular wound-up tape, designed substantially as a hollow cylinder and in at least 2 parts, there being provided on each end of the hollow cylinder a retaining body, formed by a flange and a cylindrical attachment, of which at least one retaining body can be releasably connected to the hollow cylinder, and also to such a support with stacked annular bodies.

U.S. Pat. No. 5,205,412 discloses a packaging for rolls of magnetic tape which comprises bottom and top parts in box form, respectively comprising a carton blank, and a three-part support, a hollow cylinder and hat-shaped retaining parts insertable therein, and also a retaining band, which extends through the hollow cylinder, the retaining parts and through a multiplicity of retaining parts between the rolls of tape and which holds together the pack with the rolls of tape.

The packaging and the way it is held together are complex to produce.

It is an object of the present invention to improve the known support for annular bodies. A support for annular bodies, in particular wound-up tapes, is designed substantially as a hollow cylinder and in at least two parts, there being provided on each end of the hollow cylinder a retaining body, formed by a flange and a cylindrical attachment, and of which at least one retaining body being able to be releasably connected to the hollow cylinder, according to the invention there are hook devices on each of the retaining bodies and at least one tensioning element between the hook devices, whereby at least the releasable retaining body and the hollow cylinder are held together.

This achieves simple production of such a support and simple joining together and holding together of the support parts and the annular bodies or body. Expediently, the first retaining body may also be releasably connected to the hollow cylinder.

The hook device may advantageously be formed on an inner continuation of the flange.

The inner continuation may favorably be designed as a circle-segment plate and be supported on the annular attachment.

The supporting of the circle-segment plate may be formed directly with the hook device.

The flange may be advantageously designed with an arresting projection. The cylindrical attachment may be designed with an outer collar.

The flange may also be designed with an outer flange.

The tensioning element may advantageously be a spring element or expediently an O-ring. The tensioning element is to be designed such that a constant tensile force is exerted on the retaining bodies, so that the retaining bodies or body are securely held together, even under extreme conditions in transit.

A support with at least one annular body, in particular a wound-up tape, designed substantially as a hollow cylinder with two retaining bodies at the ends, each retaining body comprising a flange and a cylindrical attachment and at least one retaining body being able to be releasably connected to the hollow cylinder, is designed according to the invention if each retaining body has a hook device, in particular arranged approximately centrally, and there is provided between the hook devices a tensioning element, reaching at least partially through the hollow cylinder.

This produces a good assembly of the annular body, which in the case of a suitable flange size of the retaining bodies at top and bottom permits a covering of the stack.

It is also possible for there to be instead of the stacked, plurality of annular bodies a singular annular body, in particular comprising a wound-up recording tape, for example a magnetic tape. In this case, the support is reduced to a winding hub or a flanged reel, depending on the respective size of the flanges of the retaining part.

The flanges of the retaining bodies may also be much smaller in diameter than the annular body outside diameters, and covering plates with central openings may form the upper and lower covering of the stack.

There may also be provided instead of the covering plates a multipart carton blank, which surrounds the stack on at least four sides. It is also possible, furthermore, for the flanges of the retaining bodies to fit into central openings of covering plates and for there to be provided outer flanges which are larger in diameter than the central openings.

Exemplary embodiments of the invention are described below and represented in the drawing, in which.

Figure 1:
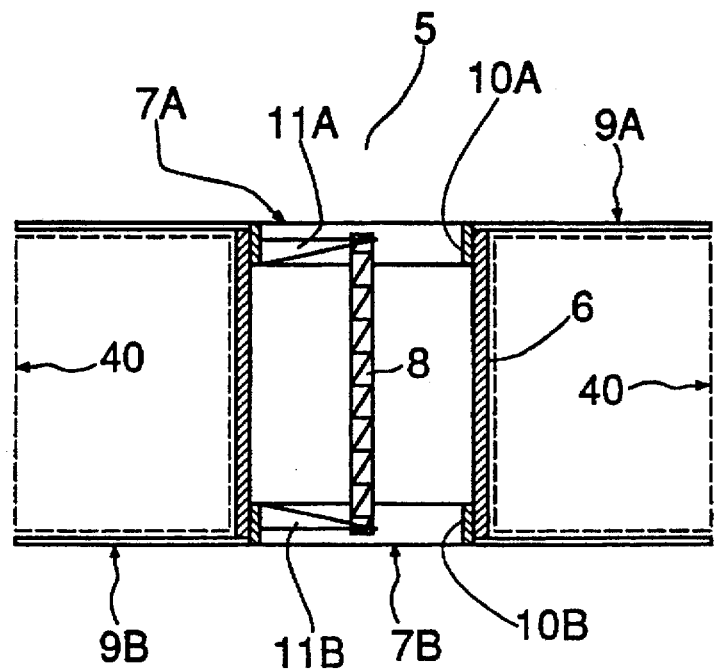
FIG. 1 shows a support according to the invention with a tension spring

The support 5 in FIG. 1 comprises a hollow cylinder 6, the retaining bodies 7A and 7B and the tensioning element, designed as a tension spring 8. The retaining bodies 7A and 7B in each case comprise the flange 9, the cylindrical attachment 10 and the hook device 11. The individual parts are denoted as associated by A and B.

Figure 3:
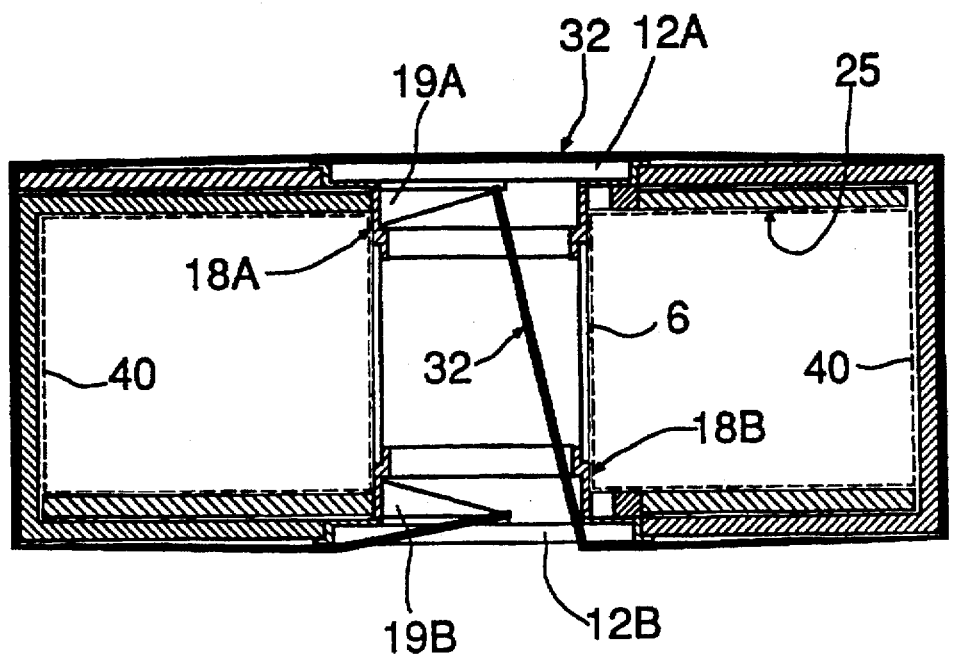
FIG. 3 shows a support according to the invention along with a packaging blank and an inner and outer band as the drawing element
Figure 4:
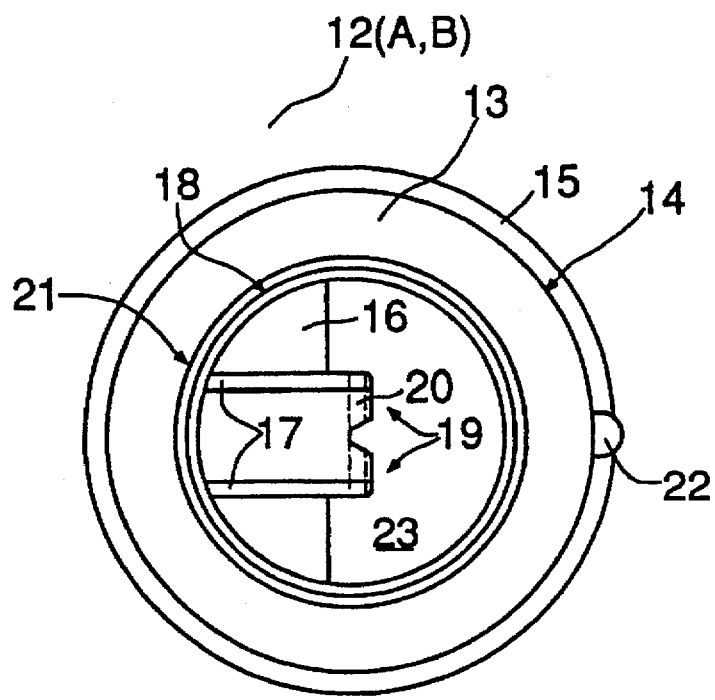
FIG. 4 shows a retaining body design in plan view, seen from the hollow cylinder.

FIG. 4 shows a configuration on a retaining body 12. The flange 13 is approximately plate-shaped and has on the plate rim 14 a narrow outer flange 15, cf. also FIGS. 2 and 3. In the plane of the flange 13 there is provided at its inner continuation a circle-segment plate 16, which carries a hook device 19, designed as two parallel wedge-shaped webs 17 and reaches up to the inside of the cylinder or annular attachment 18. The hook depressions 20 are indicated by broken lines; they lie on the rear side of the representation in FIG. 4. Provided around the cylindrical attachment 18 is a collar 21 for bearing against the end of the hollow cylinder 6. The outer flange 15 is favorably formed with a small thickness for bearing against the circumference of a central opening of a covering. The arresting continuation 22 engages in a relief (not shown) of the respective covering, in order to ensure a radial desired position of the retaining body. Through the opening 23, the drawing element is fastened to the hook devices 19.

Figure 2:
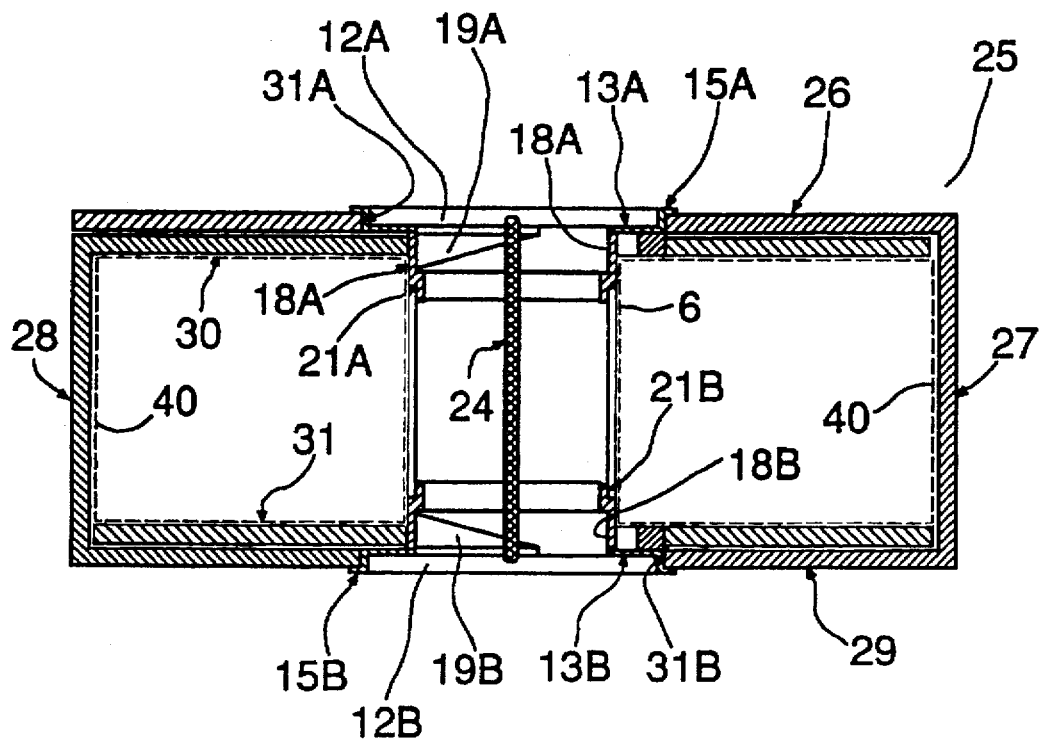
FIG. 2 shows a support according to the invention along with a packaging blank with O-ring

FIG. 2 shows two interconnected retaining bodies 12A and 12B, which may have the design of FIG. 4. The corresponding parts are denoted by the same reference numerals with the addition of A or B.

The tensioning element is in this case a commercially available O-ring 24, which is strongly braced between the hook devices 19A and 19B and consequently holds the parts of the support together. The packaging blank 25 comprises a first upper part 26, side parts 27 and 28, a lower part 29 and a second upper part 30. The upper part 26, 30 is of a double configuration for reasons of strength. Provided parallel to the lower part 29 there is also an insert part 31 for the same reason.

As can be seen in FIGS. 2 and 3, the height of the plate rim 14 corresponds approximately to the thickness of the material of the packaging blank or of the covering. The stack of annular bodies 40 or the at least one annular body 40 are or is represented diagrammatically by broken lines. The central openings of the outer blank parts are denoted by 31.

FIG. 3 shows a version of FIG. 2, just with the tensioning element 24 replaced by a packaging band 32, which runs both through the hollow cylinder 6 and around the entire circumference of the packaging blank 25. The band 32 may also be flexible.

The packaging blanks 25 expediently consist of corrugated board or similarly environmentally friendly and/or likewise recyclable material.

The parts of the support are expediently produced by injection molding from thermoplastic material.

The tensioning element is formed, depending on the configuration, in FIGS. 2 and 3 from elastomeric material FIG. 3 possibly also from bands produced from packaging fibers FIG. 1 from a resilient material, for example as a cylindrical helical spring etc.

In FIGS. 1 and 2, the tensioning element may also be replaced by a mechanical tensioning/clamping device. Such a device can also be used in FIG. 3 in connection with a relatively inflexible band.

In principle, the support described can also be used as a reel for a single wound-up body in band form, such as strips, tapes, films, magnetic tapes etc.

The invention relates to a support for at least one or more stacked annular bodies, comprising a hollow cylinder and retaining bodies with flanges and annular attachments, and also provided with hook devices for at least one tensioning element, whereby the parts of the support itself and the annular body or bodies are held together or stored.

The support can be used for any type of rings, annular plates etc. and also of wound-up bodies in band form, such as for example recording media.

A support with at least one single annular body or the stacked annular bodies is also the subject of the invention.

We claim:

1. A support for stacked annular bodies, designed substantially as a hollow cylinder having two retaining bodies at the ends, each retaining body comprising a flange, a cylindrical attachment, and a hook device and at least one retaining body capable of being releasably connected to one of the ends of the hollow cylinder and at least one tensioning element being provided between the hook devices, wherein the tensioning element is a spring element which when fastened reaches straight through the hollow cylinder from one hook on one retaining body to one hook on the other retaining body and that the retaining bodies include an opening for fastening of the spring element between the hooks.

2. The support of claim 1, wherein the other retaining body is also releasably connected to the hollow cylinder.

3. The support of claim 1, wherein the hook device is formed on an inner continuation of the flange.

4. The support of claim 1, wherein the inner continuation is designed as a circle-segment plate, which is supported on the annular attachment.

5. The support of claim 4, wherein the supporting of the circle-segment plate is formed by the hook device.

6. The support claim 1, wherein the flange is designed with an arresting projection.

7. The support claim 1, wherein the cylindrical attachment is designed with an outer collar.

8. The support of claim 1, wherein the flange is designed with an outer vertically arranged edge.

9. The support of claim 1, wherein the spring element is an O-ring.

10. The support of claim 1, wherein, instead of the stacked annular bodies, there is a single annular body, comprising a wound-up recording tape.

11. The support with at least one annular body of claim 1, wherein the flanges of the retaining bodies are much smaller in diameter than the annular body outside diameters, and a foldable carton blank surrounds the at least one annular body on at least four sides.

12. The support of claim 1, wherein the flanges of the retaining bodies fit into central openings of the carton blank, and an outer vertically arranged edge surrounds each flange, the diameter of the outer edge being greater than that of the central openings.

13. The support as of claim 1, wherein the diameters of the flanges of the retaining bodies are dimensioned such that the flanges substantially cover the at least one annular body in terms of its surface area.

14. The support of claim 1, having an approximately central arrangement of the hook arrangement with respect to the cylindrical attachment of the retaining body.

15. The support of claim 1, wherein a constant tensile force is exerted on the retaining bodies by the tensioning element.

16. The support of claim 4, wherein the residual portion of the inner continuation of the flange of the retaining body is the opening for fastening the spring element.

17. The support of claim 11, wherein the spring element is connected to one hook, surrounds the four sides of a foldable carton blank about at least one of the annular bodies, and is connected to the other hook.

* * * * *

UNITED STATES PATENT AND TRADEMARK OFFICE
CERTIFICATE OF CORRECTION

PATENT NO.: 5,690,225

DATED: November 25, 1997

INVENTOR(S): LUTZ et al.

It is certified that error appears in the above-identified patent and that said Letters Patent is hereby corrected as shown below:

Column 4, claim 6, line 1, after "support" insert --of--.

Column 4, claim 7, line 1, after "support" insert --of--.

Signed and Sealed this

Seventeenth Day of March, 1998

Attest:

BRUCE LEHMAN

Attesting Officer

Commissioner of Patents and Trademarks